(12) United States Patent
Nagahara

(10) Patent No.: US 10,295,804 B2
(45) Date of Patent: May 21, 2019

(54) ZOOM LENS, PROJECTION DISPLAY DEVICE, AND IMAGING APPARATUS THAT FORMS AN INTERMEDIATE IMAGE AT A POSTION CONJUGATE TO A REDUCTION SIDE IMAGING PLANE AND CAUSES THE INTERMEDIATE IMAGE TO BE RE-IMAGED ON A MAGNIFICATION SIDE IMAGING PLANE

(71) Applicant: FUJIFILM Corporation, Tokyo (JP)

(72) Inventor: Akiko Nagahara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 57 days.

(21) Appl. No.: 15/686,290

(22) Filed: Aug. 25, 2017

(65) Prior Publication Data
US 2018/0059390 A1 Mar. 1, 2018

(30) Foreign Application Priority Data

Aug. 30, 2016 (JP) .................. 2016-168094

(51) Int. Cl.
*G02B 23/14* (2006.01)
*G02B 15/167* (2006.01)
*G02B 13/16* (2006.01)
*G02B 15/177* (2006.01)
*G02B 15/20* (2006.01)
*G02B 15/163* (2006.01)

(52) U.S. Cl.
CPC ........... *G02B 15/167* (2013.01); *G02B 13/16* (2013.01); *G02B 15/163* (2013.01); *G02B 15/177* (2013.01); *G02B 15/20* (2013.01)

(58) Field of Classification Search
CPC ... G02B 9/00; G02B 9/34; G02B 9/60; G02B 15/00; G02B 15/14; G02B 15/16; G02B 15/161; G02B 15/163; G02B 15/167
USPC ....... 359/362, 363, 432, 434, 642, 676, 683, 359/684, 686, 689, 691, 694, 695, 754, 359/763, 771
See application file for complete search history.

(56) References Cited

U.S. PATENT DOCUMENTS 6,304,388 B1 * 10/2001 Shimo .................. G02B 15/173
 359/679
6,816,320 B2 * 11/2004 Wada .................. G02B 15/177
 359/676

(Continued)

FOREIGN PATENT DOCUMENTS

| JP | 2014-029392 A | 2/2014 |
| JP | 2015-152890 A | 8/2015 |
| JP | 2015-179270 A | 10/2015 |

*Primary Examiner* — Arnel C Lavarias
(74) *Attorney, Agent, or Firm* — Studebaker & Brackett PC

(57) ABSTRACT

The zoom lens is a lens system that forms an intermediate image, and includes, in order from the magnification side: a first lens group that remains stationary during zooming; a plurality of movable lens groups that move during zooming; and a final lens group that has a positive power and remains stationary during zooming. Two or more movable lens groups are positioned to be closer to the reduction side than the intermediate image. The lens system closer to the reduction side than the intermediate image includes, in order from the magnification side, a front group and a rear group. The zoom lens satisfies predetermined conditional expressions (1) and (2) relating to the rear group.

19 Claims, 11 Drawing Sheets

(56) References Cited

U.S. PATENT DOCUMENTS

| | | | |
|---|---|---|---|
| 7,079,324 B2* | 7/2006 | Yamasaki | G02B 13/22 359/680 |
| 7,940,470 B2* | 5/2011 | Li | G02B 15/173 359/676 |
| 7,944,619 B2* | 5/2011 | Hosokawa | G02B 13/0045 359/678 |
| 8,958,159 B2* | 2/2015 | Wacke | G02B 21/025 359/659 |
| 9,835,835 B1* | 12/2017 | Hudyma | G02B 15/167 |

* cited by examiner

EXAMPLE 1

EXAMPLE 3

EXAMPLE 1

EXAMPLE 2

EXAMPLE 3

ZOOM LENS, PROJECTION DISPLAY DEVICE, AND IMAGING APPARATUS THAT FORMS AN INTERMEDIATE IMAGE AT A POSTION CONJUGATE TO A REDUCTION SIDE IMAGING PLANE AND CAUSES THE INTERMEDIATE IMAGE TO BE RE-IMAGED ON A MAGNIFICATION SIDE IMAGING PLANE

CROSS-REFERENCE TO RELATED APPLICATIONS

The present application claims priority under 35 U.S.C. § 119 to Japanese Patent Application No. 2016-168094, filed on Aug. 30, 2016. The above application is hereby expressly incorporated by reference, in its entirety, into the present application.

BACKGROUND OF THE INVENTION

1. Field of the Invention

The present invention relates to a zoom lens forming an intermediate image, a projection display device comprising the zoom lens, and an imaging apparatus comprising the zoom lens.

2. Description of the Related Art

In the past, projection display devices (referred to as projectors), each of which projects an image displayed on a light valve such as a liquid crystal display element or a Digital Micromirror Device (DMD: registered trademark) onto a screen or the like in an enlarged manner, have come into widespread use. In particular, some widely used devices adopt a configuration in which three light valves are used, illumination light beams with three primary colors of red, green, and blue respectively correspond to the light valves, synthesizes the light beams, which are modulated through the respective light valves, through a color synthesizing prism or the like, and projects an image through a projection lens.

In recent years, with the improvement in the performance of light valves, it has become necessary to perform favorable aberration correction appropriate for the resolutions of light valves on projection lenses used in combination with light valves. Further, from the viewpoint of installability, there is a tendency that a projection lens having a zooming function is preferred.

As a lens system that is applicable to a projection display device and has a zooming function, for example, lens systems described in the following JP2015-179270A, JP2015-152890A, and JP2014-29392A have been proposed. JP2015-179270A, JP2015-152890A, and JP2014-29392A describe a lens system in which an intermediate image is formed inside a lens system and the intermediate image is re-imaged again.

SUMMARY OF THE INVENTION

Since spectral characteristics of the color synthesizing prism change depending on an angle of incident light, it is necessary for the projection lens used in combination with the color synthesizing prism to have the characteristic that the entrance pupil is at a sufficiently far position in a case where the reduction side is set as the incident side, that is, to be telecentric on the reduction side.

Further, in recent years, a larger screen size has been required with a shorter projection distance, and scenes projected onto a large screen in a large hall, exhibition, or the like through a projection display device have been increasing. For these reasons, there has been a demand for a zoom lens having a wider angle of view. In addition to the above demand, there has been a demand for the projection lens to be formed to be compact.

However, the lens system described in JP2015-179270A is not configured to be telecentric on the reduction side. In order to realize a configuration in which the lens system is telecentric on the reduction side on the extension line of the lens system described in JP2015-179270A, it is considered that it becomes difficult to minimize the total lens length. In the lens systems having the zooming functions described in JP2015-152890A and JP2014-29392A, the angle of view is not enough to satisfy the recent demands.

The present invention has been made in consideration of the above-mentioned situation, and its object is to provide a zoom lens that has a small size and has favorable optical performance with a wide angle of view while being telecentric on the reduction side, a projection display device comprising the zoom lens, and an imaging apparatus comprising the zoom lens.

A zoom lens of the present invention forms an intermediate image at a position conjugate to a reduction side imaging plane and causes the intermediate image to be re-imaged on a magnification side imaging plane. The zoom lens consists of, in order from the magnification side: a first lens group that remains stationary with respect to the reduction side imaging plane during zooming; a plurality of movable lens groups that move by changing spacings between the lens groups adjacent to each other in an optical axis direction during zooming; and a final lens group that remains stationary with respect to the reduction side imaging plane during zooming and has a positive refractive power as a whole. At least two of the movable lens groups are positioned to be closer to the reduction side than the intermediate image at a wide-angle end. A lens system closer to the reduction side than the intermediate image consists of, in order from the magnification side, a front group and a rear group. The rear group is a group, which has a maximum number of lenses included therein, among lens groups of which own magnification side focal points are positioned to be closer to the magnification side than own lens surfaces closest to the magnification side at the wide-angle end. In addition, the following conditional expressions (1) and (2) are satisfied.

$$0.05 < |fw|/frb < 0.25 \qquad (1)$$

$$1 < Drv/\text{Im } \phi < 3 \qquad (2)$$

Here, fw is a focal length of the whole system at the wide-angle end, frb is a focal length of the rear group at the wide-angle end, Drv is a distance on an optical axis from a lens surface of the front group closest to the reduction side to a lens surface of the rear group closest to the reduction side at the wide-angle end, and Im $\phi$ is an effective image circle diameter on the reduction side.

It is preferable that the zoom lens of the present invention satisfies at least one of the following conditional expressions (1-2) or (2-1).

$$0.1 < |fw|/frb < 0.2 \tag{1-2}$$

$$1.4 < Drv/\text{Im } \phi < 2.5 \tag{2-1}$$

In the zoom lens of the present invention, it is preferable that each of the two movable lens groups among the plurality of movable lens groups has a positive refractive power.

In the zoom lens of the present invention, it is preferable that the lens system closer to the reduction side than the intermediate image has a negative refractive power as a whole at the wide-angle end.

It is preferable that the zoom lens of the present invention satisfies the following conditional expression (3), and it is more preferable that the zoom lens satisfies the following conditional expression (3-2).

$$0.2 < |hmxr/(\text{Im } \phi/2)| < 1 \tag{3}$$

$$0.3 < |hmxr/(\text{Im } \phi/2)| < 0.6 \tag{3-2}$$

Here, hmxr is a maximum ray height on a lens surface closer to the reduction side than the intermediate image in a case where a ray with a height of |fw| from the optical axis is incident from the reduction side into the zoom lens in parallel with the optical axis at the wide-angle end, and Im $\phi$ is an effective image circle diameter on the reduction side.

It is preferable that the zoom lens of the present invention satisfies the following conditional expression (4), and it is more preferable that the zoom lens satisfies the following conditional expression (4-2).

$$0.8 < |fw/fp| < 1.2 \tag{4}$$

$$0.9 < |fw/fp| < 1.15 \tag{4-2}$$

Here, fw is a focal length of the whole system at the wide-angle end, and fp is a focal length of the lens system closer to the magnification side than the intermediate image at the wide-angle end.

In the zoom lens of the present invention, it is preferable that the intermediate image is positioned inside the movable lens group at the wide-angle end. In a case where the intermediate image is positioned inside the movable lens group, it is preferable that the first lens group has a negative refractive power as a whole. Further, in the case where the intermediate image is positioned inside the movable lens group, it is preferable that the zoom lens satisfies the following conditional expression (5), and it is more preferable that the zoom lens satisfies the following conditional expression (5-1).

$$0 \le |(Daw-Dat)/fw| < 0.1 \tag{5}$$

$$0 \le |(Daw-Dat)/fw| < 0.05 \tag{5-1}$$

Here, Daw is a distance on the optical axis from the intermediate image to a magnification side lens surface closest to the intermediate image on the optical axis at the wide-angle end, Dat is a distance on the optical axis from the intermediate image to a magnification side lens surface closest to the intermediate image on the optical axis at the telephoto end, and fw is a focal length of the whole system at the wide-angle end.

In the zoom lens of the present invention, it is preferable that a reduction side lens closest to the intermediate image on the optical axis at the wide-angle end is a positive lens. In this case, it is preferable that a magnification side surface of the positive lens is a concave surface. Further, in this case, it is preferable that the positive lens satisfies the following conditional expression (6), and it is more preferable that the positive lens satisfies the following conditional expression (6-2).

$$1.7 < Ndr1 < 2.2 \tag{6}$$

$$1.8 < Ndr1 < 2.2 \tag{6-2}$$

Here, Ndr1 is a refractive index of the positive lens at the d line.

A projection display device of the present invention comprises: a light source; a light valve into which light originating from the light source is incident; and the zoom lens of the present invention, the zoom lens projecting an optical image, which is formed by light modulated through the light valve, onto a screen.

An imaging apparatus of the present invention comprises the zoom lens of the present invention.

It should be noted that, in a case where the zoom lens of the present invention is applied to a projection display device, the "magnification side" means a projected side (screen side). Even in a case where projection is performed in a reduced manner, for convenience, the screen side is referred to as the magnification side. On the other hand, the "reduction side" means an original image display region side (light valve side). Even in a case where projection is performed in a reduced manner, for convenience, the light valve side is referred to as the reduction side.

It should be noted that the "consists of . . . " means that the zoom lens may include, substantially, not only the above-mentioned elements but also lenses substantially having no powers, optical elements, which are not lenses, such as a reflection member having no power, a stop, a mask, a cover glass, and/or a filter, and the like.

It should be noted that the " . . . lens group", "front group", "rear group", and "group" is not necessarily formed of a plurality of lenses, but may be formed of only one lens. Signs of refractive powers of the lens groups and signs of refractive powers of the lenses are assumed as those in paraxial regions in a case where some lenses have aspheric surfaces. All the conditional expressions are based on the d line (a wavelength of 587.6 nm).

According to the present invention, a zoom lens forms an intermediate image and includes, in order from the magnification side: a first lens group that remains stationary during zooming; a plurality of movable lens groups that move during zooming; and a final lens group that has a positive power and remains stationary during zooming. A configuration thereof in a range from the intermediate image to the reduction side is appropriately set, and the configuration is made to satisfy predetermined conditional expressions. Therefore, it is possible to provide a zoom lens that has a small size and has favorable optical performance with a wide angle of view while being telecentric on the reduction side, a projection display device comprising the zoom lens, and an imaging apparatus comprising the zoom lens.

DESCRIPTION OF THE PREFERRED EMBODIMENTS

Figure 1:
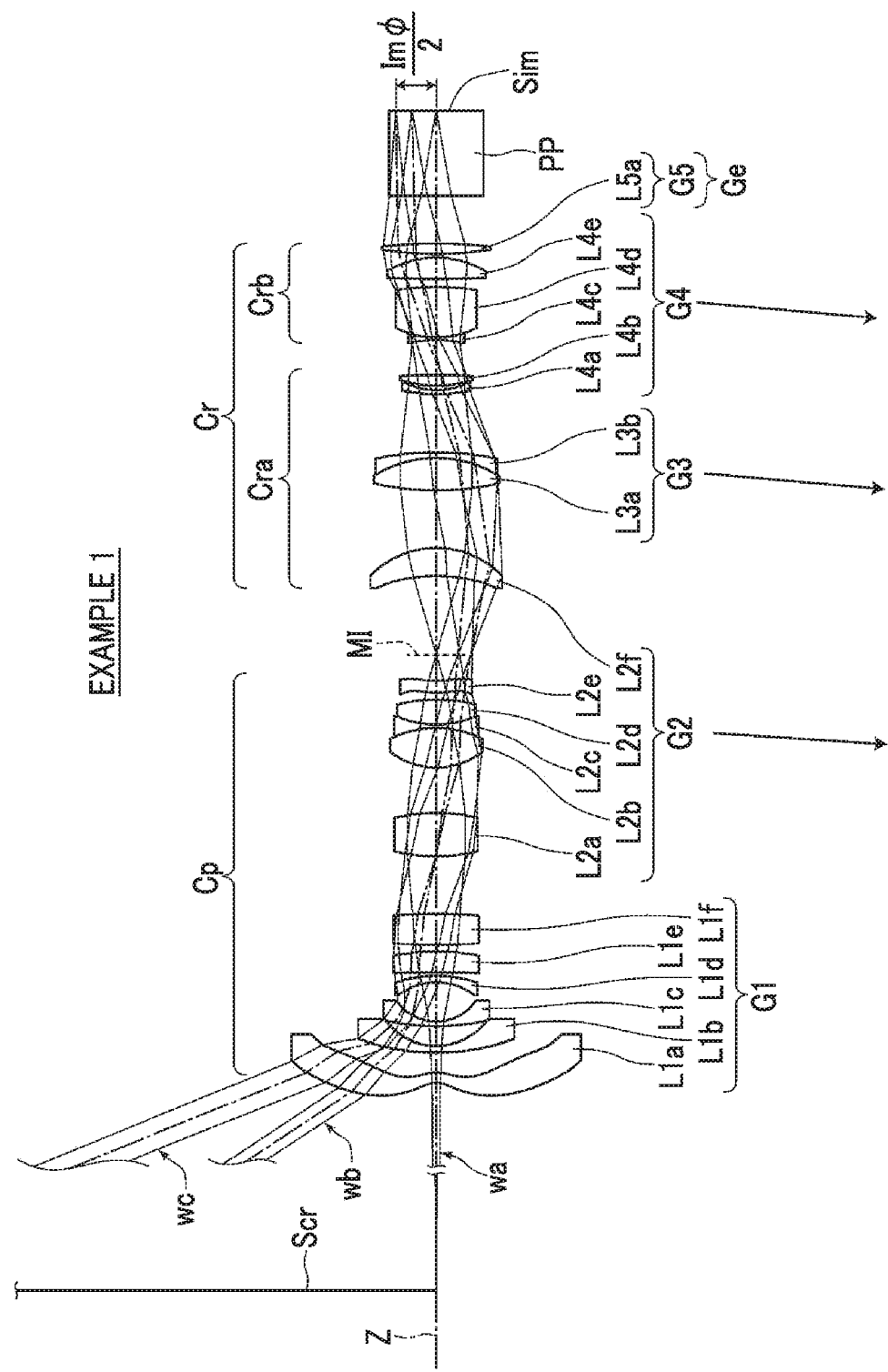
FIG. 1 is a cross-sectional view illustrating a configuration and an optical path of a zoom lens of Example 1 of the present invention.

Hereinafter, embodiments of the present invention will be described with reference to drawings. FIG. 1 is a cross-sectional view illustrating a configuration of a zoom lens at the wide-angle end according to an embodiment of the present invention. The exemplary configuration shown in FIG. 1 corresponds to Example 1 to be described later. In FIG. 1, the left side is the magnification side, and the right side is the reduction side. Further, in FIG. 1, additionally, on-axis rays wa, rays with the medium angle of view wb, and rays with the maximum angle of view we are also shown.

This zoom lens is, for example, mounted on a projection display device, and can be used to project image information displayed on the light valve onto the screen. In FIG. 1, assuming that the zoom lens is mounted on the projection display device, a screen Scr, an optical member PP such as a filter and a prism used in a color synthesizing section or an illumination light separating section, and an image display surface Sim of a light valve positioned on a reduction side surface of the optical member PP are also shown. In the example of FIG. 1, the image display surface Sim corresponds to the reduction side imaging plane, and the screen Scr corresponds to the magnification side imaging plane.

It should be noted that FIG. 1 shows an example in which a position of a reduction side surface of the optical member PP coincides with a position of the image display surface Sim, but the present invention is not limited to this. Further, in FIG. 1, for simplification of the drawing, only one image display surface Sim is shown, but the projection display device may be configured such that the rays originating from a light source is separated into rays with three primary colors through a color separation optical system, three light valves for the respective primary colors are arranged, and a full-color image is displayed.

The zoom lens includes, in order from the magnification side along an optical axis Z: a first lens group G1 that remains stationary with respect to the reduction side imaging plane during zooming; a plurality of movable lens groups that move by changing spacings between the lens groups adjacent to each other in an optical axis direction during zooming; and a final lens group Ge that remains stationary with respect to the reduction side imaging plane during zooming and has a positive refractive power as a whole.

The first lens group G1 closest to the magnification side remains stationary during zooming, and thereby it is possible to decrease diameters of the lenses of the movable lens groups. The final lens group Ge closest to the reduction side has a positive refractive power, and thereby it becomes easy that the zoom lens is configured to be telecentric on the reduction side. Further, the final lens group Ge remains stationary during zooming, and thereby it becomes easy that the zoom lens is kept telecentric on the reduction side even in a case where zooming is performed.

The zoom lens of the example shown in FIG. 1 includes, in order from the magnification side along the optical axis Z, the first lens group G1, a second lens group G2, a third lens group G3, a fourth lens group G4, and a fifth lens group G5. During zooming, the first lens group G1 and the fifth lens group G5 remain stationary with respect to the image display surface Sim, and the second lens group G2, the third lens group G3, and the fourth lens group G4 move by changing mutual spacings in the optical axis direction. That is, in the example shown in FIG. 1, three lens groups of the second lens group G2, the third lens group G3, and the fourth lens group G4 respectively correspond to the movable lens groups, and the fifth lens group G5 corresponds to the final lens group Ge. In FIG. 1, under each of the second lens group G2, the third lens group G3, and the fourth lens group G4, a direction of each lens group moving during zooming from the wide-angle end to the telephoto end is schematically indicated by an arrow. It should be noted that the number of movable lens groups belonging to the zoom lens may be different from the number thereof in the example shown in FIG. 1, and may be, for example, two as shown in examples to be described later.

In the example shown in FIG. 1, the first lens group G1 includes, in order from the magnification side, six lenses as lenses L1a to L1f, the second lens group G2 includes, in order from the magnification side, six lenses as lenses L2a to L2f, the third lens group G3 includes, in order from the magnification side, two lenses as lenses L3a and L3b, the fourth lens group G4 includes, in order from the magnification side, five lenses as lenses L4a to L4e, and the fifth lens group G5 includes only one lens as a lens L5a. In addition, each lens group may include lenses of which the number is different from that in the example shown in FIG. 1.

Further, the zoom lens forms an intermediate image MI at a position conjugate to the reduction side imaging plane and causes the intermediate image MI to be re-imaged on the magnification side imaging plane. The intermediate image MI is formed inside the zoom lens. In addition, in FIG. 1, only a part of the intermediate image MI including the vicinity of the optical axis is indicated by the dotted line.

Paying attention to the intermediate image MI, it can be considered that the zoom lens is formed of two parts with the intermediate image MI interposed therebetween. Hereinafter, an optical system closer to the magnification side than the intermediate image MI is referred to as a projection section Cp, and an optical system closer to the reduction side than the intermediate image MI is referred to as a relay section Cr. That is, the zoom lens includes, in order from the magnification side, the projection section Cp and the relay section Cr. The names of the projection section Cp and the relay section Cr are names in a configuration in which attention is paid to the intermediate image, and the names of the above-mentioned first to fifth lens groups G1 to G5 are names in a configuration in which attention is paid to zooming. Hereinafter, using these names appropriately, description will be given.

In a case where the zoom lens is applied to the projection display device, the relay section Cr primarily forms the intermediate image MI which is conjugate to an image displayed on the image display surface Sim, and the projection section Cp projects and secondarily forms a final image, which is conjugate to the intermediate image MI, onto the screen Scr.

In a zoom lens of a system which does not form an intermediate image, in a case where an increase in angle of view is intended to be achieved by shortening a focal length thereof, the size of the magnification side lens inevitably becomes excessively large. However, in a manner similar to that of the present embodiment, in a zoom lens of a system which forms an intermediate image, it is possible to shorten a back focal length of the lens system closer to the magnification side than the intermediate image MI. Therefore, it is possible to decrease a magnification side lens diameter of the lens system closer to the magnification side than the intermediate image MI, and this configuration is appropriate for achieving an increase in angle of view by shortening a focal length thereof.

For example, in the example of FIG. 1, the intermediate image MI is positioned between the lens L2e and the lens L2f, the projection section Cp includes the lenses L1a to L1f, and lenses L2a to L2e, and the relay section Cr includes a lens L2f, lenses L3a and L3b, lenses L4a to L4e, and a lens L5a.

In the example of FIG. 1, at the wide-angle end, the intermediate image MI is positioned inside the movable lens group. In such a case, by suppressing fluctuation in field curvature, it becomes easy to achieve reduction in size. In a case where the intermediate image MI is positioned inside the lens group, it is preferable that the intermediate image MI is positioned in the same lens group in the entire zooming range. If the intermediate image MI is positioned on the lens surface, in a case where the zoom lens is applied to a projection display device, scratches and/or dust on the lens surface are projected onto the screen Scr together with the final image. In order to reduce a possibility that such a situation occurs, it is preferable that the intermediate image MI is formed to be positioned in the same lens group in the entire zooming range. It should be noted that the position of the intermediate image MI may be different from the position thereof in the example shown in FIG. 1. As shown in the examples to be described later, the intermediate image MI may be positioned inside the first lens group G1. Alternatively, the intermediate image MI may be positioned between the lens groups of which a spacing changes during zooming.

The zoom lens is formed such that at least two movable lens groups are positioned to be closer to the reduction side than the intermediate image MI at the wide-angle end. As described above, by adopting a configuration in which the relay section Cr includes at least two movable lens groups at the wide-angle end, it is possible to reduce the load of the zooming operation of the projection section Cp, and it becomes easy to achieve an increase in angle of view.

It is preferable that each of the two movable lens groups among the plurality of movable lens groups belonging to the zoom lens has a positive refractive power. In such a case, it becomes easy to decrease a diameter (a height from the optical axis) of the intermediate image MI. Therefore, it becomes easy to achieve an increase in angle of view while keeping a diameter of the magnification side lens small. More preferably, the zoom lens is formed to include, continuously in order from a position closest to the reduction side: a final lens group Ge that remains stationary during zooming and has a positive refractive power; and two movable lens groups each of which has a positive refractive power. In such a case, it becomes easy to set a small movement range of the movable lens group during zooming. Therefore, it becomes easy to achieve an increase in angle of view of the whole system while suppressing a length of the relay section Cr in the optical axis direction.

It is preferable that the relay section Cr has a negative refractive power as a whole at the wide-angle end. In such a case, it is possible to decrease a magnification side lens diameter of the projection section Cp.

The relay section Cr is formed to include, in order from the magnification side, a front group Cra and a rear group Crb to be described below. The rear group Crb is a lens group within the relay section Cr including a lens closest to the reduction side, and is a group, which has a maximum number of lenses included therein, among lens groups of which own magnification side focal points are positioned to be closer to the magnification side than own lens surfaces closest to the magnification side at the wide-angle end. In the relay section Cr, there may be a plurality of groups which include the lens closest to the reduction side and are appropriate for a condition in which the own magnification side focal points are positioned to be closer to the magnification side than the own lens surface closest to the magnification side. For example, in the example of FIG. 1, the group including only the lens L5a, the group including the lens L4e and the lens L5a, and the group including the lenses L4c to L4e and the lens L5a are appropriate for the condition. Among these three groups, the group, which has the maximum number of lenses included therein, is a group including the lenses L4c to L4e and the lens L5a. Accordingly, the rear group Crb of the example of FIG. 1 becomes a group including four lenses as the lenses L4c to L4e and the lens L5a. Then, the front group Cra becomes a group including five lenses as the lens L2f, the lenses L3a and L3b, and the lenses L4a and L4b.

In a case where the rear group Crb is defined as described above and the relay section Cr is divided into the front group Cra and the rear group Crb, a position, at which a principal ray of off-axis rays intersects with the optical axis Z, is set between the front group Cra and the rear group Crb or in the vicinity thereof. In a case where the zoom lens is configured to be telecentric on the reduction side thereof as in the example shown in FIG. 1, the pupil position is set between the front group Cra and the rear group Crb or in the vicinity thereof.

The zoom lens is configured to satisfy the following conditional expressions (1) and (2).

$$0.05 < |fw|/frb < 0.25 \tag{1}$$

$$1 < Drv/\text{Im } \phi < 3 \tag{2}$$

Here, fw is a focal length of the whole system at the wide-angle end, frb is a focal length of the rear group Crb at the wide-angle end, Drv is a distance on an optical axis from a lens surface of the front group Cra closest to the reduction side to a lens surface of the rear group Crb closest to the reduction side at the wide-angle end, and Im $\phi$ is an effective image circle diameter on the reduction side.

By not allowing the result of the conditional expression (1) to be equal to or less than the lower limit, it is possible to minimize a total lens length of the relay section Cr. By not allowing the result of the conditional expression (1) to be equal to or greater than the upper limit, it is possible to prevent an increase in angle between the optical axis Z and emitted light which is obtained in a case where the principal ray incident from the reduction side in a state where the zoom lens is telecentric is emitted from the rear group Crb. Thereby, it becomes easy to decrease a lens diameter of the front group Cra. As a result, it becomes easy to decrease a diameter of the magnification side lens while maintaining a small necessary F number and a large necessary angle of view.

In order to enhance the effect relating to the lower limit of the conditional expression (1) while obtaining the effect relating to the upper limit of the conditional expression (1), it is preferable that the following conditional expression (1-1) is satisfied. In order to enhance the effect relating to the conditional expression (1), it is more preferable that the following conditional expression (1-2) is satisfied.

$$0.1<|fw|/frb<0.25 \quad (1\text{-}1)$$

$$0.1<|fw|/frb<0.2 \quad (1\text{-}2)$$

By not allowing the result of the conditional expression (2) to be equal to or less than the lower limit, it becomes easy to decrease diameters of the lenses near the magnification side and the reduction side of the intermediate image MI. By not allowing the result of the conditional expression (2) to be equal to or greater than the upper limit, it is possible to minimize the total lens length in the optical system in which the zoom lens is configured to be telecentric on the reduction side.

In order to enhance the effect relating to the conditional expression (2), it is preferable that the following conditional expression (2-1) is satisfied, and it is more preferable that the following conditional expression (2-2) is satisfied.

$$1.4<Drv/\text{Im } \phi<2.5 \quad (2\text{-}1)$$

$$1.55<Drv/\text{Im } \phi<1.8 \quad (2\text{-}2)$$

Further, it is preferable that the zoom lens satisfies the following conditional expression (3).

$$0.2<|hmxr/(\text{Im } \phi/2)|<1 \quad (3)$$

Here, hmxr is a maximum ray height on a lens surface closer to the reduction side than the intermediate image MI in a case where a ray with a height of |fw| from the optical axis is incident from the reduction side into the zoom lens in parallel with the optical axis at the wide-angle end, and Im $\phi$ is an effective image circle diameter on the reduction side.

Figure 2:
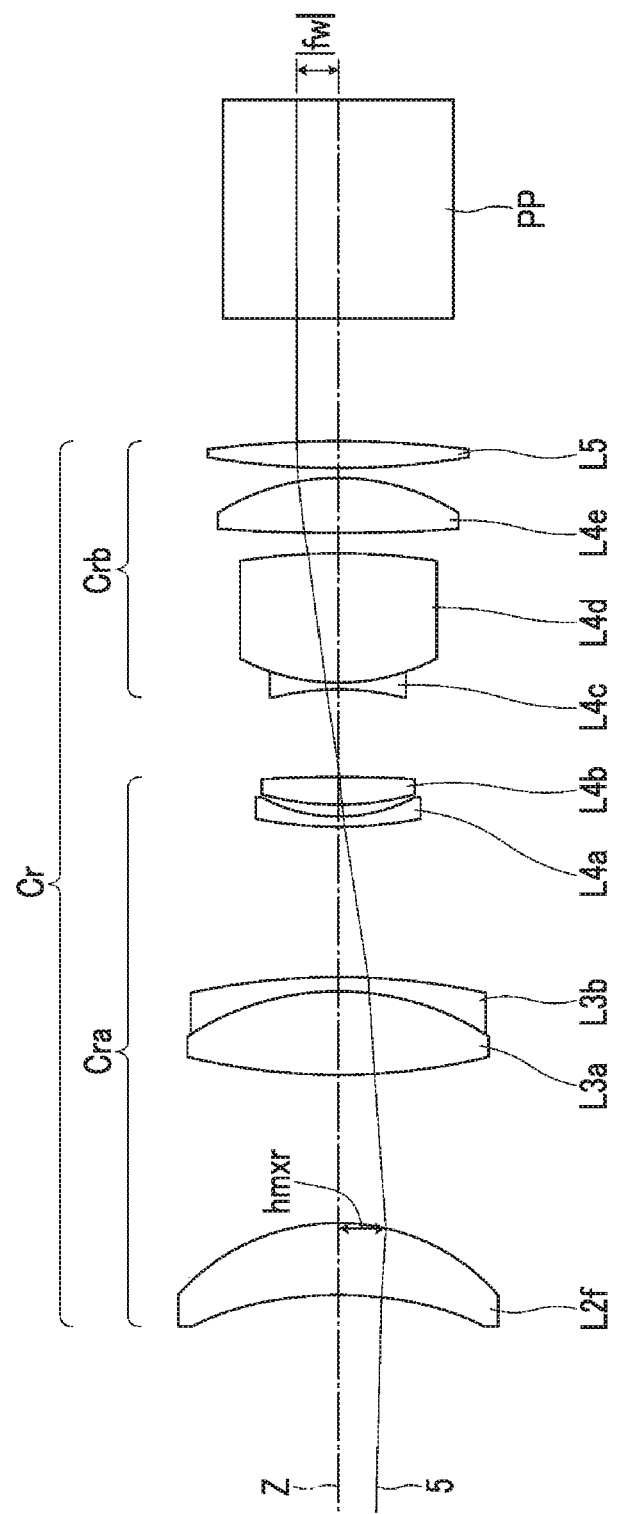
FIG. 2 is a diagram illustrating hmxr of conditional expression (3).

FIG. 2 is a diagram illustrating parts of the optical member PP and the relay section Cr of the zoom lens shown in FIG. 1. FIG. 2 exemplifies hmxr in a case where a ray 5 with a height of |fw| from the optical axis is incident from the reduction side of the zoom lens toward the magnification side in parallel with the optical axis at the wide-angle end. In the example shown in FIG. 2, the ray height on the reduction side surface of the lens L2f is hmxr.

By not allowing the result of the conditional expression (3) to be equal to or less than the lower limit, it is possible to prevent a relay magnification of the relay section Cr from excessively decreasing, and reduce a load of performance and the magnification of the projection section Cp. Therefore, it becomes easy to obtain favorable performance for the whole system. By not allowing the result of the conditional expression (3) to be equal to or greater than the upper limit, it becomes easy to decrease the lens diameter of the relay section Cr.

In order to enhance the effect relating to the upper limit of the conditional expression (3) while obtaining the effect relating to the lower limit of the conditional expression (3), it is preferable that the following conditional expression (3-1) is satisfied. In order to enhance the effect relating to the conditional expression (3), it is more preferable that the following conditional expression (3-2) is satisfied.

$$0.2<|hmxr/(\text{Im } \phi/2)|<0.6 \quad (3\text{-}1)$$

$$0.3<|hmxr/(\text{Im } \phi/2)|<0.6 \quad (3\text{-}2)$$

Further, it is preferable that the zoom lens satisfies the following conditional expression (4).

$$0.8<|fw/fp|<1.2 \quad (4)$$

Here, fp is a focal length of the lens system closer to the magnification side than the intermediate image MI at the wide-angle end, and fw is a focal length of the whole system at the wide-angle end.

The fp is a focal length of the projection section Cp at the wide-angle end. By not allowing the result of the conditional expression (4) to be equal to or less than the lower limit, it is possible to minimize the magnification of the projection section Cp. Therefore, it becomes easy to minimize various aberrations, particularly, lateral chromatic aberration to an amount that does not cause problems in practice. By not allowing the result of the conditional expression (4) to be equal to or greater than the upper limit, it is possible to make the reduction side lens diameter of the projection section Cp smaller than the magnification side lens diameter of the relay section Cr. Therefore, even in the optical system with a small F number and a wide angle of view, it becomes easy to minimize the lens diameter of the whole system.

In order to enhance the effect relating to the lower limit of the conditional expression (4) while obtaining the effect relating to the upper limit of the conditional expression (4), it is preferable that the following conditional expression (4-1) is satisfied. In order to enhance the effect relating to the conditional expression (4), it is more preferable that the following conditional expression (4-2) is satisfied.

$$0.85<|fw/fp|<1.2 \quad (4\text{-}1)$$

$$0.9<|fw/fp|<1.15 \quad (4\text{-}2)$$

It should be noted that, in a case where the intermediate image MI is positioned inside the movable lens group, it is preferable that the following conditional expression (5) is satisfied.

$$0\leq|(Daw-Dat)/fw|<0.1 \quad (5)$$

Here, Daw is a distance on the optical axis from the intermediate image MI to a magnification side lens surface closest to the intermediate image MI on the optical axis at the wide-angle end, Dat is a distance on the optical axis from the intermediate image MI to a magnification side lens surface closest to the intermediate image MI on the optical axis at the telephoto end, and fw is a focal length of the whole system at the wide-angle end.

The (Daw-Dat) of the conditional expression (5) is an amount of change in distance from the lens of the projection section Cp closest to the reduction side to the intermediate image MI due to zooming. By not allowing the result of the conditional expression (5) to be equal to or greater than the upper limit, it is possible to adopt a configuration in which a positional relationship between the intermediate image MI and the projection section Cp scarcely changes even in a case where zooming is performed. Therefore, it becomes easy to suppress fluctuation in field curvature.

In order to enhance the effect relating to the conditional expression (5), it is preferable that the following conditional expression (5-1) is satisfied.

$$0 \leq |(Daw-Dat)/fw| < 0.05 \quad (5\text{-}1)$$

In a case where the intermediate image MI is positioned inside the movable lens group, it is preferable that the first lens group G1 has a negative refractive power as a whole. In such a case, it becomes easy to achieve an increase in angle of view while suppressing change in field curvature caused by zooming.

Further, in the zoom lens, it is preferable that a reduction side lens closest to the intermediate image MI on the optical axis at the wide-angle end is a positive lens. That is, it is preferable that a positive lens is disposed to be closest to the magnification side of the relay section Cr. In such a case, it is possible to decrease the lens diameter of the relay section Cr.

In a case where a positive lens is disposed to be closest to the magnification side of the relay section Cr, it is preferable that a magnification side surface of the positive lens is a concave surface. In such a case, it becomes easy to correct field curvature.

Further, in the case where a positive lens is disposed to be closest to the magnification side of the relay section Cr, it is preferable that the positive lens satisfies the following conditional expression (6).

$$1.7 < Ndr1 < 2.2 \quad (6)$$

Here, Ndr1 is a refractive index of the positive lens closest to the magnification side of the relay section Cr at the d line.

By not allowing the result of the conditional expression (6) to be equal to or less than the lower limit, it becomes easy to correct field curvature. By not allowing the result of the conditional expression (6) to be equal to or greater than the upper limit, there is an advantage in terms of a transmittance and costs.

In order to enhance the effect relating to the lower limit of the conditional expression (6) while obtaining the effect relating to the upper limit of the conditional expression (6), it is preferable that the following conditional expression (6-1) is satisfied, and it is more preferable that the following conditional expression (6-2) is satisfied.

$$1.75 < Ndr1 < 2.2 \quad (6\text{-}1)$$

$$1.8 < Ndr1 < 2.2 \quad (6\text{-}2)$$

It should be noted that refractive indices of all the lenses of the zoom lens at the d line are smaller than 2.2.

The above-mentioned preferred configurations and available configurations may be arbitrary combinations, and it is preferable to selectively adopt the configurations in accordance with required specification. According to the present embodiment, it is possible to realize a zoom lens that has a small size and has favorable optical performance with a wide angle of view while being telecentric on the reduction side. It should be noted that the "wide angle of view" described herein means that the total angle of view at the wide-angle end is greater than 1200.

Next, numerical examples of the zoom lens of the present invention will be described.

Example 1

A lens configuration of a zoom lens of Example 1 is shown in FIG. 1, and a configuration and a method thereof shown in the drawing is as described above. Therefore, repeated descriptions are partially omitted herein. The zoom lens of Example 1 includes, in order from the magnification side, a first lens group G1, a second lens group G2, a third lens group G3, a fourth lens group G4, and a fifth lens group G5. During zooming, the first lens group G1 and the fifth lens group G5 remain stationary, and the second lens group G2, the third lens group G3, and the fourth lens group G4 move. An intermediate image MI is formed inside the second lens group G2.

Table 1 shows basic lens data of the zoom lens of Example 1, Table 2 shows various kinds of data, and Table 3 shows aspheric coefficients thereof. In Table 1, the column of Si shows i-th (i=1, 2, 3, . . . ) surface number. The i-th surface number is attached to each of surfaces of the elements, where i sequentially increases toward the reduction side in a case where a magnification side surface of an element closest to the magnification side is regarded as a first surface. The column of Ri shows a radius of curvature of the i-th surface. The column of Di shows a surface spacing on the optical axis between the i-th surface and an (i+1)th surface. In Table 1, the column of Ndj shows a refractive index of a j-th (j=1, 2, 3, . . . ) element at the d line (a wavelength of 587.6 nm), where j sequentially increases toward the reduction side in a case where the element closest to the magnification side is regarded as the first element. The column of vdj shows an Abbe number of the j-th element on the basis of the d line.

Here, signs of radii of curvature of surface shapes convex toward the magnification side are set to be positive, and signs of radii of curvature of surface shapes convex toward the reduction side are set to be negative. Table 1 additionally shows the optical member PP. In Table 1, the variable surface spacings, which are variable during zooming, are referenced by the reference signs DD[ ], and are written into places of Di, where magnification side surface numbers of spacings are noted in [ ].

In the range of Table 2, values of the absolute value |f| of the focal length of the whole system, the magnification β, the F number FNo., the maximum total angle of view 2ω, and the variable surface spacing are based on the d line. (°) in the place of 2ω indicates that the unit thereof is a degree. In Table 2, values at the wide-angle end state are shown in the column labeled by WIDE, and values at the telephoto end state are shown in the column labeled by TELE. Outside the range of Table 2, values of a distance D (Scr to S1) on the optical axis from the magnification side imaging plane to the lens surface closest to the magnification side and a distance D (S38 to Sim) from the reduction side surface of the optical member PP to the reduction side imaging plane are shown.

In Table 1, the reference sign * is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E±n" (n: an integer) in numerical values of the aspheric coefficients of Table 3 indicates "×10$^{\pm n}$". The aspheric coefficients are values of the coefficients KA and Am (m=3, 4, 5, . . . 20, or m=4, 6, 8, 10) in aspheric surface expression represented by the following expression.

$$Zd = \frac{C \times h^2}{1 + \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, and KA and Am are aspheric coefficients.

In the data of each table, degree is used as the unit of an angle, and mm is used as the unit of a length, but appropriate different units may be used since the optical system can be used even in a case where the system is enlarged or reduced in proportion. Further, each of the following tables shows numerical values rounded off to predetermined decimal places.

TABLE 1

EXAMPLE 1

| Si | Ri | Di | Ndj | vdj |
|---|---|---|---|---|
| *1 | −4.3018 | 2.6651 | 1.53158 | 55.08 |
| *2 | −6.5115 | 5.1726 | | |
| 3 | 54.4074 | 1.7247 | 1.69680 | 55.53 |
| 4 | 15.3800 | 5.0295 | | |
| *5 | 49.8134 | 1.2421 | 1.80400 | 46.58 |
| 6 | 11.4728 | 10.2287 | | |
| 7 | −14.9695 | 1.7357 | 1.59282 | 68.62 |
| 8 | −29.4133 | 0.9579 | | |
| 9 | −216.2969 | 5.4433 | 1.83481 | 42.72 |
| 10 | −49.5437 | 1.7247 | | |
| 11 | 141.3794 | 8.1635 | 1.90366 | 31.31 |
| 12 | −97.8638 | DD[12] | | |
| 13 | 42.4386 | 11.3792 | 1.49700 | 81.54 |
| 14 | −38.3410 | 11.8726 | | |
| 15 | 17.8198 | 10.3510 | 1.59282 | 68.62 |
| 16 | −24.4391 | 0.9317 | 1.80518 | 25.46 |
| 17 | 23.2331 | 6.5323 | 1.49700 | 81.54 |
| 18 | −36.5216 | 1.8000 | | |
| *19 | 19.9504 | 3.1375 | 1.49100 | 57.58 |
| *20 | 26.4419 | 27.4815 | | |
| *21 | −41.0636 | 7.3389 | 1.83400 | 37.16 |
| 22 | −21.7501 | DD[22] | | |
| 23 | 65.7787 | 8.5029 | 1.83481 | 42.72 |
| 24 | −27.8165 | 1.4490 | 1.84666 | 23.78 |
| 25 | −70.8402 | DD[25] | | |
| 26 | 43.8585 | 1.0346 | 1.89286 | 20.36 |
| 27 | 16.3002 | 1.2182 | | |
| 28 | 29.0314 | 2.8237 | 1.90366 | 31.31 |
| 29 | −128.8598 | 8.9215 | | |
| 30 | −26.6875 | 0.6903 | 1.84666 | 23.78 |
| 31 | 21.6047 | 13.1872 | 1.59282 | 68.62 |
| 32 | −64.7987 | 2.0672 | | |
| 33 | 174.4992 | 5.6141 | 1.49700 | 81.54 |
| 34 | −22.8012 | DD[35] | | |

TABLE 1-continued

EXAMPLE 1

| Si | Ri | Di | Ndj | vdj |
|---|---|---|---|---|
| 35 | 81.4910 | 2.7250 | 1.89286 | 20.36 |
| 36 | −106.1259 | 12.5215 | | |
| 37 | ∞ | 22.2759 | 1.51633 | 64.14 |
| 38 | ∞ | | | |

TABLE 2

EXAMPLE 1

| | WIDE | TELE |
|---|---|---|
| \|f\| | 4.19 | 4.40 |
| β | 119.4 | 113.7 |
| FNo. | 2.00 | 2.00 |
| 2ω (°) | 133.6 | 131.8 |
| DD[12] | 15.09 | 14.49 |
| DD[22] | 15.11 | 13.27 |
| DD[25] | 15.32 | 16.34 |
| DD[35] | 1.01 | 2.43 |
| D (Scr~S1) | 489.66 | |
| D (S38~Sim) | 0.00 | |

TABLE 3

EXAMPLE 1

SURFACE NUMBER

| | 1 | 2 | 5 |
|---|---|---|---|
| KA | −1.281535577E+00 | −1.779455754E+00 | 1.000000000E+00 |
| A3 | 5.235788630E−03 | 4.829025389E−03 | |
| A4 | −9.609454642E−05 | −2.050901737E−04 | −1.960082876E−05 |
| A5 | −3.417342323E−05 | 1.498597667E−04 | |
| A6 | 2.393103761E−06 | −4.121200708E−05 | 1.166446116E−07 |
| A7 | 2.356160645E−08 | 5.725633343E−06 | |
| A8 | −7.704930337E−09 | −5.439127275E−07 | −5.895583355E−11 |
| A9 | 1.524250488E−10 | 4.031149971E−08 | |
| A10 | 1.152728344E−11 | −2.351866483E−09 | −2.77893E−15 |
| A11 | −4.628723471E−13 | 1.005998594E−10 | |
| A12 | −7.544417262E−15 | −2.874709467E−12 | |
| A13 | 5.946627691E−16 | 5.077724555E−14 | |
| A14 | −4.388916522E−19 | −6.570523507E−16 | |
| A15 | −4.048519425E−19 | 1.341568597E−17 | |
| A16 | 3.654802831E−21 | −1.982908001E−19 | |
| A17 | 1.427640048E−22 | −2.989329943E−21 | |
| A18 | −2.002803443E−24 | 9.165012117E−23 | |
| A19 | −2.053537167E−26 | 5.570552210E−25 | |
| A20 | 3.588019308E−28 | −1.937488670E−26 | |

SURFACE NUMBER

| | 19 | 20 | 21 |
|---|---|---|---|
| KA | −1.278935555E+02 | 5.435753286E+00 | 1.000000000E+00 |
| A3 | −8.304303596E−04 | 1.253573891E−03 | |
| A4 | 2.725631966E−03 | −1.092034939E−03 | −4.44535E−06 |
| A5 | −7.633170821E−04 | 4.643524889E−04 | |
| A6 | 2.210225222E−05 | −6.371363228E−05 | −2.134238525E−08 |
| A7 | 1.793272746E−05 | −1.447444636E−05 | |
| A8 | −2.098936733E−06 | 3.901509263E−06 | 8.07207E−12 |
| A9 | −1.757191787E−07 | 1.097257886E−07 | |
| A10 | 3.426904198E−08 | −9.837739715E−08 | 1.165780975E−14 |
| A11 | 9.354895358E−10 | 3.419576172E−09 | |
| A12 | −2.810119554E−10 | 1.244645720E−09 | |
| A13 | −2.765567720E−12 | −8.132111342E−11 | |
| A14 | 1.320785397E−12 | −8.234131811E−12 | |
| A15 | 3.916091125E−15 | 7.186170331E−13 | |
| A16 | −3.610002363E−15 | 2.531114055E−14 | |
| A17 | −8.190872979E−19 | −2.945340390E−15 | |
| A18 | 5.351178262E−18 | −1.322774474E−17 | |

TABLE 3-continued

EXAMPLE 1

| A19 | −2.546808602E-21 | 4.656736614E-18 |
| A20 | −3.334925057E-21 | −6.607949738E-20 |

Figure 5:
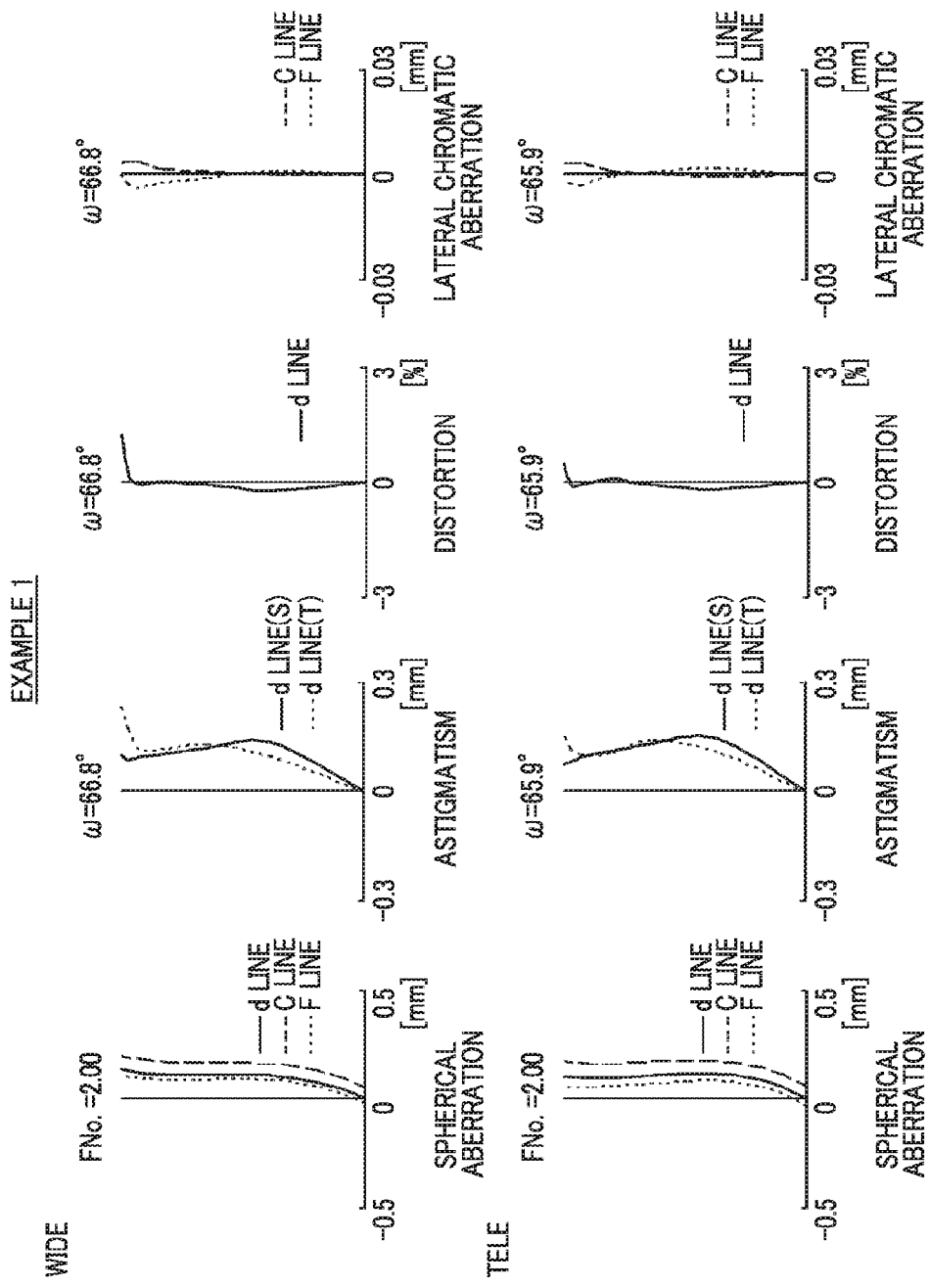
FIG. 5 is a diagram of aberrations of the zoom lens of Example 1 of the present invention.

FIG. 5 shows aberration diagrams of spherical aberration, astigmatism, distortion, and lateral chromatic aberration (chromatic aberration of magnification) of the zoom lens of Example 1, in order from the left side. In FIG. 5, aberrations at the wide-angle end state are shown in the upper part indicated by WIDE, and aberrations at the telephoto end state are shown in the lower part indicated by TELE. In the spherical aberration diagram, aberrations at the d-line (a wavelength of 587.6 nm), the C-line (a wavelength of 656.3 nm), and the F-line (a wavelength of 486.1 nm) are respectively indicated by a solid line, a long dashed line, and the short dashed line. In the astigmatism diagram, aberration in the sagittal direction at the d line is indicated by a solid line, and aberration in the tangential direction at the d line is indicated by a short dashed line. In the distortion diagram, aberration at the d line is indicated by a solid line. In the lateral chromatic aberration diagram, aberrations at the C line and the F line are respectively indicated by a long dashed line and a short dashed line. In the spherical aberration diagram, FNo. indicates an F number. In the other aberration diagrams, ω indicates a half angle of view. The aberration diagrams shown in FIG. 5 are diagrams of aberrations in a case where the reduction side imaging plane and the magnification side imaging plane are at the distances noted outside and beneath the range of Table 2.

In the description of Example 1, reference signs, meanings, and description methods of the respective data pieces are the same as those in the following examples unless otherwise noted. Therefore, in the following description, repeated description will be omitted.

Example 2

Figure 3:
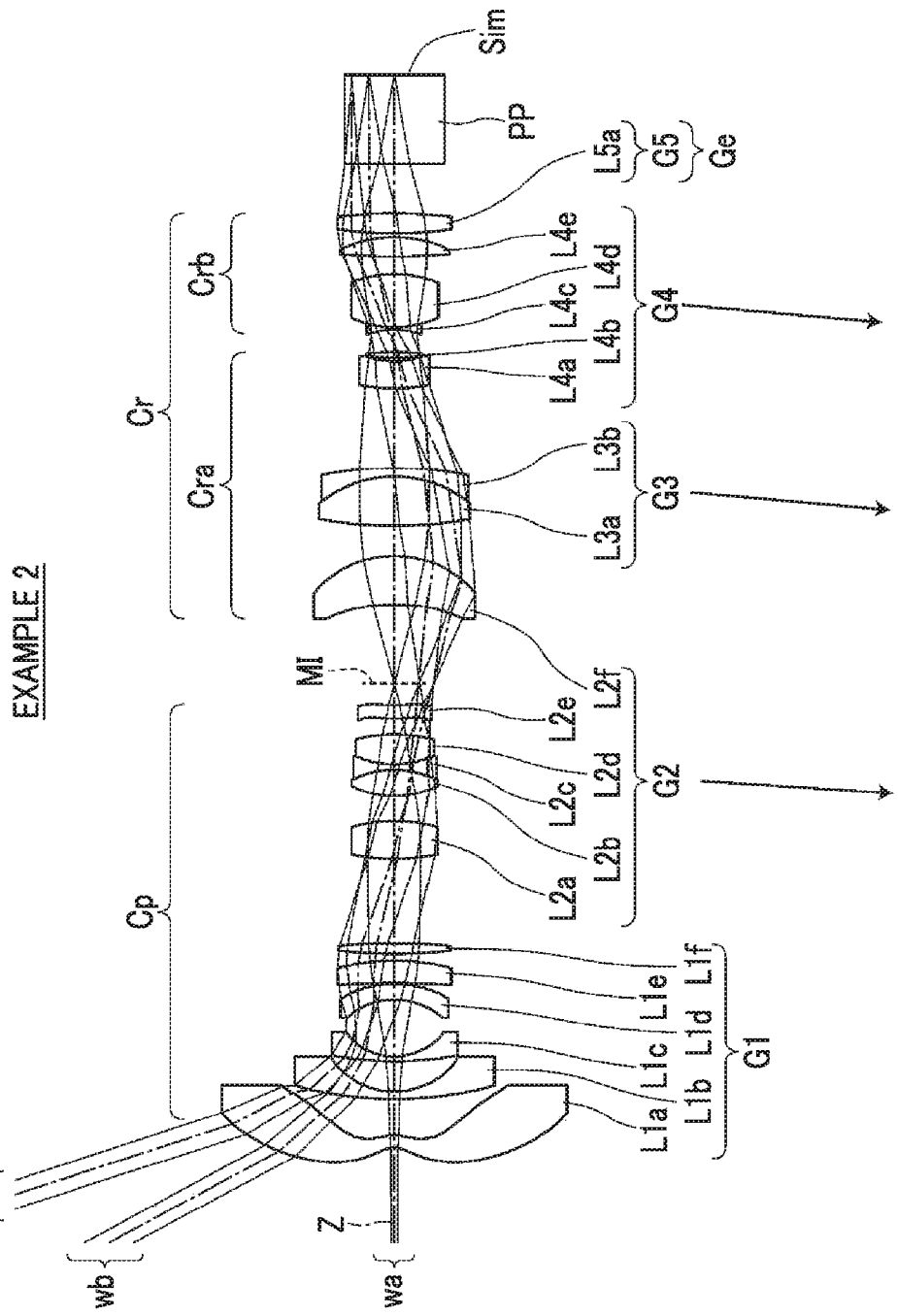
FIG. 3 is a cross-sectional view illustrating a configuration and an optical path of a zoom lens of Example 2 of the present invention.

FIG. 3 is a cross-sectional diagram of a lens configuration and an optical path of a zoom lens of Example 2. The zoom lens of Example 2 includes, in order from the magnification side, a first lens group G1, a second lens group G2, a third lens group G3, a fourth lens group G4, and a fifth lens group G5. During zooming, the first lens group G1 and the fifth lens group G5 remain stationary, and the second lens group G2, the third lens group G3, and the fourth lens group G4 move. In Example 2, the fifth lens group G5 corresponds to the final lens group Ge. The first lens group G1 includes, in order from the magnification side, six lenses as lenses L1a to L1f, the second lens group G2 includes, in order from the magnification side, six lenses as lenses L2a to L2f, the third lens group G3 includes, in order from the magnification side, two lenses as lenses L3a and L3b, the fourth lens group G4 includes, in order from the magnification side, five lenses as lenses L4a to L4e, and the fifth lens group G5 includes only one lens as a lens L5a.

An intermediate image MI is formed inside the second lens group G2, and the intermediate image MI is positioned between the lens L2e and the lens L2f. A projection section Cp includes, the lenses L1a to L1f and the lenses L2a to L2e, and a relay section Cr includes the lens L2f, the lenses L3a and L3b, the lenses L4a to L4e, and the lens L5a. The relay section Cr includes a front group Cra and a rear group Crb. The front group Cra includes the lens L2f, the lenses L3a and L3b, and the lenses L4a and L4b, and the rear group Crb includes the lenses L4c to L4e, and the lens L5a.

Figure 6:
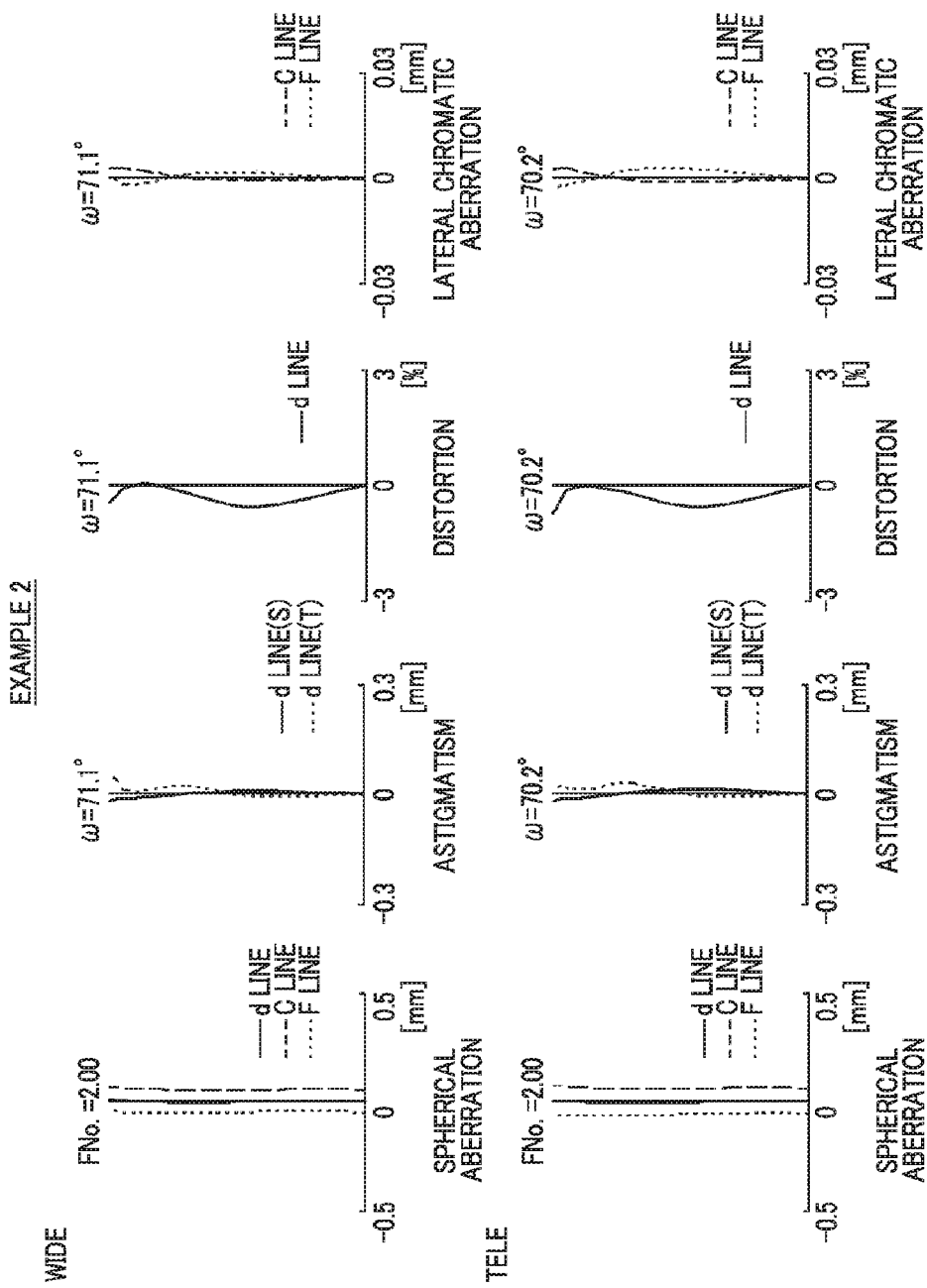
FIG. 6 is a diagram of aberrations of the zoom lens of Example 2 of the present invention.

Table 4 shows basic lens data of the zoom lens of Example 2, Table 5 shows various kinds of data, Table 6 shows aspheric coefficients, and FIG. 6 shows aberration diagrams. The data shown in FIG. 6 is data in a case where the reduction side imaging plane and the magnification side imaging plane are at the distances noted outside and beneath the range of Table 5.

TABLE 4

EXAMPLE 2

| Si | Ri | Di | Ndj | νdj |
|---|---|---|---|---|
| *1 | −3.9258 | 3.1037 | 1.53158 | 55.08 |
| *2 | −6.6674 | 9.0167 | | |
| 3 | 84.5054 | 1.8402 | 1.69680 | 55.53 |
| 4 | 17.3088 | 7.6118 | | |
| *5 | 55.8371 | 1.2407 | 1.80400 | 46.58 |
| 6 | 13.9867 | 14.2116 | | |
| 7 | −16.1213 | 3.9488 | 1.59282 | 68.62 |
| 8 | −23.3208 | 0.1384 | | |
| 9 | −200.8834 | 5.7152 | 1.83481 | 42.72 |
| 10 | −49.0318 | 1.7248 | | |
| 11 | 107.6393 | 2.6253 | 1.90366 | 31.31 |
| 12 | −117.2064 | DD[12] | | |
| 13 | 48.1259 | 9.4978 | 1.49700 | 81.54 |
| 14 | −34.6322 | 6.2104 | | |
| 15 | 20.9019 | 6.6271 | 1.59282 | 68.62 |
| 16 | −20.6672 | 1.3306 | 1.80518 | 25.46 |
| 17 | 20.7742 | 7.5940 | 1.49700 | 81.54 |
| 18 | −33.2183 | 3.8261 | | |
| *19 | 23.8746 | 3.4286 | 1.49100 | 57.58 |
| *20 | 36.4478 | 25.0914 | | |
| *21 | −42.1535 | 12.2050 | 1.83400 | 37.16 |
| 22 | −23.7526 | DD[22] | | |
| 23 | 91.3107 | 12.4214 | 1.83481 | 42.72 |
| 24 | −26.5924 | 2.2066 | 1.84666 | 23.78 |
| 25 | −82.9830 | DD[25] | | |
| 26 | 39.8212 | 6.8970 | 1.89286 | 20.36 |
| 27 | 18.0179 | 0.8279 | | |
| 28 | 41.3339 | 1.3794 | 1.90366 | 31.31 |
| 29 | −68.8597 | 5.6332 | | |
| 30 | −16.9633 | 0.6900 | 1.84666 | 23.78 |
| 31 | 22.9259 | 13.3373 | 1.59282 | 68.62 |
| 32 | −25.6607 | 4.3219 | | |
| 33 | 140.1251 | 4.8737 | 1.49700 | 81.54 |
| 34 | −27.4746 | DD[35] | | |
| 35 | 90.2922 | 4.9518 | 1.89286 | 20.36 |
| 36 | −102.3716 | 12.4692 | | |
| 37 | ∞ | 22.2759 | 1.51633 | 64.14 |
| 38 | ∞ | | | |

TABLE 5

EXAMPLE 2

| | WIDE | TELE |
|---|---|---|
| \|f\| | 3.39 | 3.56 |
| β | 147.6 | 140.6 |
| FNo. | 2.00 | 2.00 |
| 2ω (°) | 142.2 | 140.4 |
| DD[12] | 21.19 | 21.14 |
| DD[22] | 7.46 | 4.20 |
| DD[25] | 20.07 | 21.63 |
| DD[35] | 1.06 | 2.82 |
| D (Scr~S1) | 489.66 | |
| D (S38~Sim) | 0.00 | |

TABLE 6

EXAMPLE 2

SURFACE NUMBER

| | 1 | 2 | 5 |
|---|---|---|---|
| KA  | −1.709528815E+00 | −4.043239050E+00 | 1.000000000E+00 |
| A3  | 3.798058773E−03  | 3.194791672E−03  |  |
| A4  | −6.885504302E−05 | −2.670595465E−04 | −3.041992000E−05 |
| A5  | −1.883278153E−05 | 2.234185033E−04  |  |
| A6  | 1.211295421E−06  | −5.691406223E−05 | 1.143113269E−07 |
| A7  | 9.500958301E−07  | 8.154037985E−06  |  |
| A8  | −3.054573840E−09 | −8.302890529E−07 | −5.780496564E−11 |
| A9  | 5.319277527E−11  | 6.578053012E−08  |  |
| A10 | 3.613140687E−12  | −4.030125829E−09 | −2.991543445E−15 |
| A11 | −1.240364172E−13 | 1.794750890E−10  |  |
| A12 | −1.935834994E−15 | −5.394196916E−12 |  |
| A13 | 1.235989682E−16  | 1.038318003E−13  |  |
| A14 | 4.486735675E−20  | −1.490207551E−15 |  |
| A15 | −6.540182120E−20 | 2.785268301E−17  |  |
| A16 | 4.615195558E−22  | −3.627412044E−19 |  |
| A17 | 1.794154872E−23  | −6.393256552E−21 |  |
| A18 | −2.065205685E−25 | 1.841316176E−22  |  |
| A19 | −2.008986071E−27 | 1.321934672E−24  |  |
| A20 | 2.922379376E−29  | −4.391912806E−26 |  |

SURFACE NUMBER

| | 19 | 20 | 21 |
|---|---|---|---|
| KA  | −1.145295623E+02 | 3.841492782E+00  | 1.000000000E+00 |
| A3  | −5.157840990E−04 | −9.136325157E−04 |  |
| A4  | 1.612437825E−03  | 3.351193462E−04  | −1.692451806E−06 |
| A5  | −5.021268496E−04 | −1.124837898E−04 |  |
| A6  | 2.205235090E−05  | −2.501751078E−05 | −2.164713792E−08 |
| A7  | 9.917393534E−06  | 8.618526637E−06  |  |
| A8  | −1.239875270E−06 | 1.775393491E−07  | 7.537988502E−12 |
| A9  | −7.895196405E−08 | −2.263592487E−07 |  |
| A10 | 1.679931662E−08  | 5.559284588E−09  | 2.417331853E−15 |
| A11 | 3.188332036E−10  | 3.327540172E−09  |  |
| A12 | −1.170277295E−10 | −1.582519501E−10 |  |
| A13 | −5.715036768E−13 | −2.801186344E−11 |  |
| A14 | 4.704578557E−13  | 1.734127826E−12  |  |
| A15 | −1.651093693E−16 | 1.343236366E−13  |  |
| A16 | −1.103170758E−15 | −9.718572330E−15 |  |
| A17 | 2.133567697E−18  | −3.409776250E−16 |  |
| A18 | 1.405676145E−18  | 2.767864782E−17  |  |
| A19 | −2.224117630E−21 | 3.546782701E−19  |  |
| A20 | −7.543520107E−22 | −3.186518049E−20 |  |

Example 3

Figure 4:
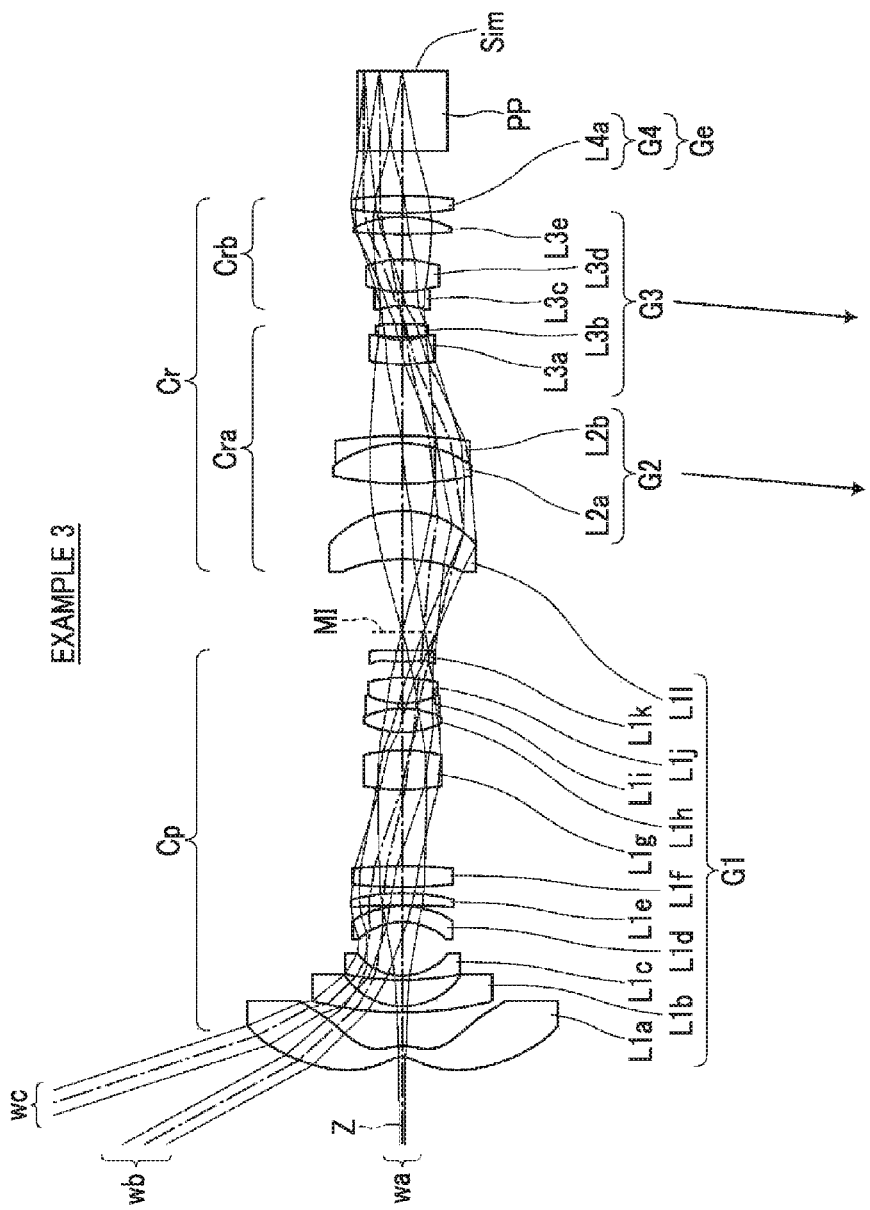
FIG. 4 is a cross-sectional view illustrating a configuration and an optical path of a zoom lens of Example 3 of the present invention.

FIG. 4 is a cross-sectional diagram of a lens configuration and an optical path of a zoom lens of Example 3. The zoom lens of Example 3 includes, in order from the magnification side, a first lens group G1, a second lens group G2, a third lens group G3, and a fourth lens group G4. During zooming, the first lens group G1 and the fourth lens group G4 remain stationary, and the second lens group G2 and the third lens group G3 move. In Example 3, the fourth lens group G4 corresponds to the final lens group Ge. The first lens group G1 includes, in order from the magnification side, twelve lenses as lenses L1a to L1l the second lens group G2 includes, in order from the magnification side, two lenses as lenses L2a and L2b, the third lens group G3 includes, in order from the magnification side, five lenses as lenses L3a to L3e, and the fourth lens group G4 includes only one lens as a lens L4a.

An intermediate image MI is formed inside the first lens group G1, and the intermediate image MI is positioned between the lens L1k and the lens L1l. A projection section Cp includes the lenses L1a to L1k, and a relay section Cr includes the lens L1l, the lenses L2a and L2b, the lenses L3a to L3e, and the lens Ma. The relay section Cr includes a front group Cra and a rear group Crb. The front group Cra includes the lens L1l, the lenses L2a and L2b, and the lenses L3a and L3b, and the rear group Crb includes the lenses L3c to L3e, and the lens L4a.

Figure 7:
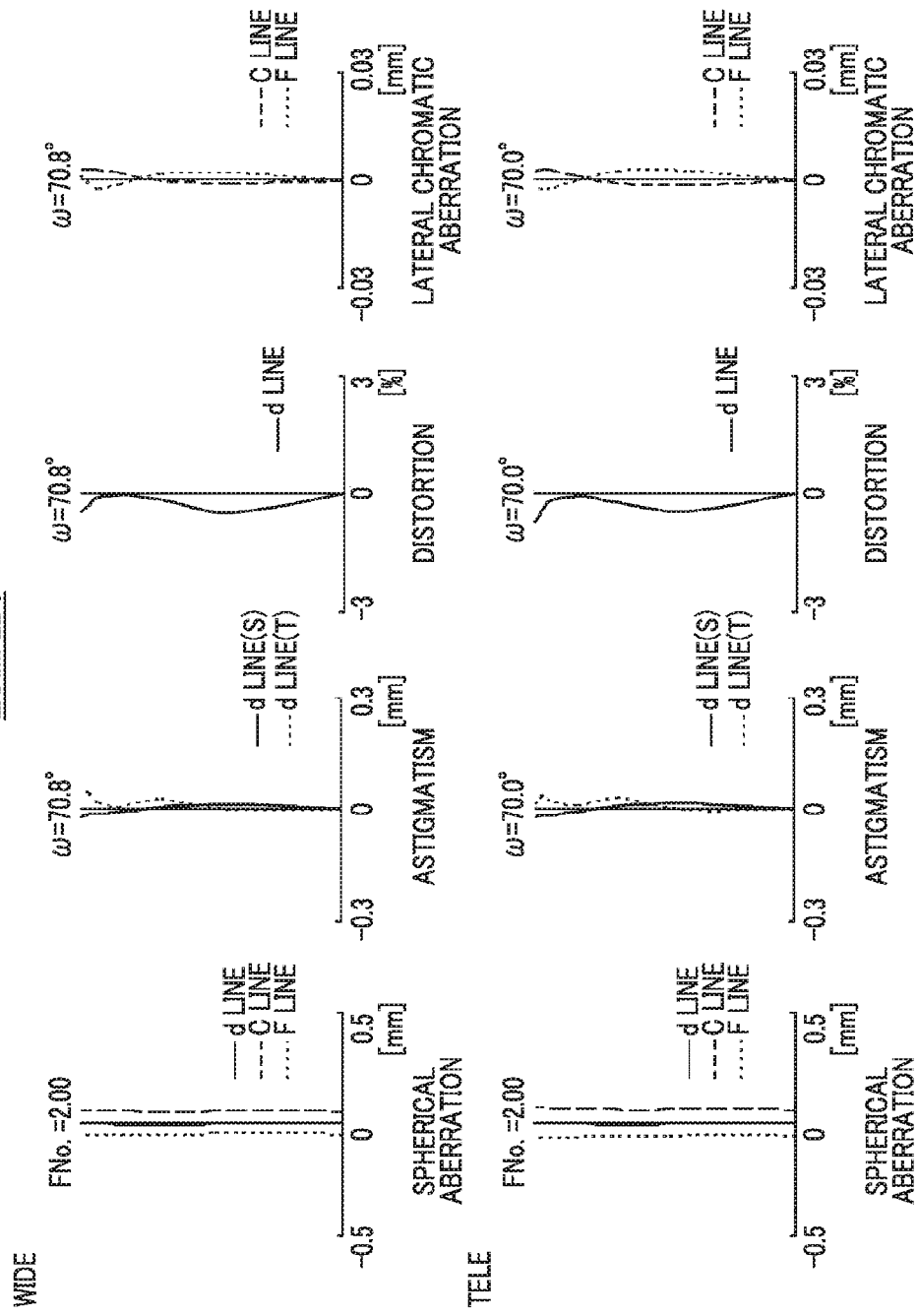
FIG. 7 is a diagram of aberrations of the zoom lens of Example 3 of the present invention.

Table 7 shows basic lens data of the zoom lens of Example 3, Table 8 shows various kinds of data, Table 9 shows aspheric coefficients, and FIG. 7 shows aberration diagrams. The data shown in FIG. 7 is data in a case where the reduction side imaging plane and the magnification side imaging plane are at the distances noted outside and beneath the range of Table 8.

TABLE 7

EXAMPLE 3

| Si | Ri | Di | Ndj | vdj |
|---|---|---|---|---|
| *1  | −3.9261   | 3.1028  | 1.53158 | 55.08 |
| *2  | −6.6674   | 9.2268  |         |       |
| 3   | 87.9406   | 1.7243  | 1.69680 | 55.53 |
| 4   | 17.5353   | 7.2616  |         |       |
| *5  | 54.2864   | 1.2408  | 1.80400 | 46.58 |
| 6   | 14.2107   | 14.9180 |         |       |
| 7   | −15.9688  | 4.5125  | 1.59282 | 68.62 |
| 8   | −22.0377  | 0.1922  |         |       |
| 9   | −187.1105 | 3.3112  | 1.83481 | 42.72 |
| 10  | −50.1636  | 1.7243  |         |       |
| 11  | 109.2648  | 5.8546  | 1.90366 | 31.31 |
| 12  | −134.3402 | 21.2535 |         |       |
| 13  | 53.6247   | 10.9636 | 1.59282 | 68.62 |
| 14  | −38.6576  | 5.0139  |         |       |
| 15  | 21.6966   | 6.6322  | 1.59282 | 68.62 |
| 16  | −21.8692  | 1.4180  | 1.80518 | 25.46 |
| 17  | 19.6183   | 7.1138  | 1.49700 | 81.54 |
| 18  | −35.1083  | 4.4075  |         |       |
| *19 | 24.1707   | 3.1734  | 1.49100 | 57.58 |
| *20 | 39.6030   | 25.1690 |         |       |
| *21 | −41.1759  | 13.4971 | 1.83400 | 37.16 |
| 22  | −24.3035  | DD[22]  |         |       |
| 23  | 75.9290   | 11.1603 | 1.83481 | 42.72 |
| 24  | −29.2766  | 2.2063  | 1.84666 | 23.78 |
| 25  | −104.0156 | DD[25]  |         |       |
| 26  | 42.2806   | 6.7602  | 1.89286 | 20.36 |
| 27  | 18.8129   | 0.8641  |         |       |
| 28  | 47.3959   | 3.5848  | 1.90366 | 31.31 |
| 29  | −62.0620  | 5.0920  |         |       |
| 30  | −17.9944  | 3.8293  | 1.84666 | 23.78 |
| 31  | 27.2161   | 8.9730  | 1.59282 | 68.62 |
| 32  | −26.3998  | 7.0962  |         |       |
| 33  | 148.9135  | 4.8282  | 1.49700 | 81.54 |
| 34  | −28.1958  | DD[35]  |         |       |
| 35  | 86.4463   | 4.8269  | 1.89286 | 20.36 |
| 36  | −100.4970 | 12.4105 |         |       |
| 37  | ∞         | 22.2759 | 1.51633 | 64.14 |
| 38  | ∞         |         |         |       |

TABLE 8

EXAMPLE 3

| | WIDE | TELE |
|---|---|---|
| \|f\|       | 3.44   | 3.61   |
| β          | 145.3  | 138.4  |
| FNo.       | 2.00   | 2.00   |
| 2ω (°)     | 141.6  | 140.0  |
| DD[22]     | 7.56   | 4.23   |
| DD[25]     | 20.09  | 21.47  |
| DD[35]     | 1.01   | 2.95   |
| D (Scr~S1) | 489.66 |        |
| D (S38~Sim)| 0.00   |        |

TABLE 9

EXAMPLE 3

| | SURFACE NUMBER | | |
|---|---|---|---|
| | 1 | 2 | 5 |
| KA | −1.709620226E+00 | −4.042577349E+00 | 1.000000000E+00 |
| A3 | 3.802116478E−03 | 3.197685140E−03 | |
| A4 | −6.920395872E−05 | −2.667550481E−04 | −3.044881706E−05 |
| A5 | −1.887719355E−05 | 2.224189488E−04 | |
| A6 | 1.215991325E−06 | −5.665061931E−05 | 1.143040846E−07 |
| A7 | 9.562726472E−09 | 8.111822492E−06 | |
| A8 | −3.070001121E−09 | −8.252840420E−07 | −5.780794296E−11 |
| A9 | 5.331954285E−11 | 6.532854521E−08 | |
| A10 | 3.637370404E−12 | −3.999545095E−09 | −2.991677388E−15 |
| A11 | −1.245291817E−13 | 1.779901747E−10 | |
| A12 | −1.955106927E−15 | −5.345428147E−12 | |
| A13 | 1.242274587E−16 | 1.028001394E−13 | |
| A14 | 5.122877813E−20 | −1.474207800E−15 | |
| A15 | −6.580051362E−20 | 2.754628597E−17 | |
| A16 | 4.623006950E−22 | −3.585534397E−19 | |
| A17 | 1.806836733E−23 | −6.315267468E−21 | |
| A18 | −2.076038239E−25 | 1.817206187E−22 | |
| A19 | −2.025100454E−27 | 1.303745561E−24 | |
| A20 | 2.942865285E−29 | −4.327463176E−26 | |

| | SURFACE NUMBER | | |
|---|---|---|---|
| | 19 | 20 | 21 |
| KA | −1.145296328E+02 | 3.841726580E+00 | 1.000000000E+00 |
| A3 | −4.825969245E−04 | −7.383456856E−04 | |
| A4 | 1.547674504E−03 | 2.323270573E−04 | −1.706536585E−06 |
| A5 | −5.017262288E−04 | −1.201176451E−04 | |
| A6 | 2.361636746E−05 | −2.099264954E−05 | −2.166355292E−08 |
| A7 | 9.892470914E−06 | 8.704897682E−06 | |
| A8 | −1.259475102E−06 | 8.944815871E−08 | 7.536164635E−12 |
| A9 | −7.870898351E−08 | −2.248266510E−07 | |
| A10 | 1.693719981E−08 | 6.717377239E−09 | 2.417046001E−15 |
| A11 | 3.180909869E−10 | 3.271661134E−09 | |
| A12 | −1.175784046E−10 | −1.671490508E−10 | |
| A13 | −5.731586381E−13 | −2.735005319E−11 | |
| A14 | 4.716136056E−13 | 1.769980415E−12 | |
| A15 | −1.482044474E−16 | 1.304432112E−13 | |
| A16 | −1.104006173E−15 | −9.762996525E−15 | |
| A17 | 2.092083165E−18 | −3.296155048E−16 | |
| A18 | 1.404745360E−18 | 2.753508671E−17 | |
| A19 | −2.189098996E−21 | 3.414418777E−19 | |
| A20 | −7.528969642E−22 | −3.147585736E−20 | |

Table 10 shows values corresponding to the conditional expressions (1) to (6) of the zoom lenses of Examples 1 to 3 and values relating to the corresponding values. fr of Table 10 is a focal length of the relay section Cr. The values shown in Table 10 are based on the d line.

TABLE 10

| EXPRESSION NUMBER | | EXAMPLE 1 | EXAMPLE 2 | EXAMPLE 3 |
|---|---|---|---|---|
| (1) | \|fw\|/frb | 0.15 | 0.14 | 0.14 |
| (2) | Drv/Imφ | 1.71 | 1.74 | 1.78 |
| (3) | \|hm × r/(Imφ2)\| | 0.48 | 0.48 | 0.49 |
| (4) | \|fw/fp\| | 1.06 | 0.98 | 1.00 |
| (5) | \|(Daw − Dat)/fw\| | 0.02 | 0.00 | 0.00 |
| (6) | Ndr1 | 1.83400 | 1.83400 | 1.83400 |
| | \|fw\| | 4.19 | 3.39 | 3.44 |
| | frb | 27.81 | 23.90 | 24.68 |
| | fp | 3.94 | 3.46 | 3.44 |
| | fr | −229.25 | −117.41 | −115.86 |
| | Drv | 34.22 | 34.87 | 35.66 |
| | Imφ/2 | 10.00 | 10.00 | 10.00 |
| | \|hm × r\| | 4.80 | 4.80 | 4.90 |
| | Daw | 12.73 | 5.59 | 5.63 |
| | Dat | 12.79 | 5.59 | 5.63 |

As can be seen from the above-mentioned data, each of the zoom lenses of Examples 1 to 3 has a small F number of 2.00, has a wide angle of view in that the total angle of view is equal to or greater than 130° at the wide-angle end, and has a small size while being telecentric on the reduction side, whereby aberrations are satisfactorily corrected, and high optical performance is achieved.

Figure 8:
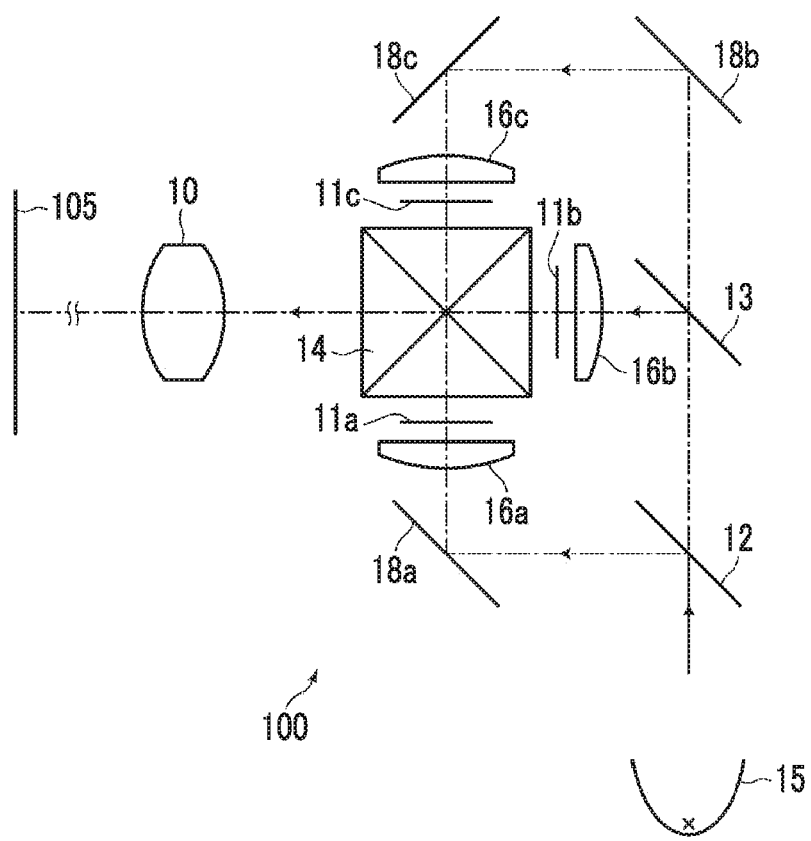
FIG. 8 is a schematic configuration diagram of a projection display device according to an embodiment of the present invention.

Next, a projection display device according to an embodiment of the present invention will be described. FIG. 8 is a schematic configuration diagram of the projection display device according to the embodiment of the present invention. The projection display device 100 shown in FIG. 8 has a zoom lens 10 according to the embodiment of the present invention, a light source 15, transmissive display elements 11a to 11c as light valves corresponding to respective color light beams, dichroic mirrors 12 and 13 for color separation, a cross dichroic prism 14 for color synthesis, condenser lenses 16a to 16c, and total reflection mirrors 18a to 18c for deflecting the optical path. In FIG. 8, the zoom lens 10 is schematically illustrated. Further, an integrator is disposed between the light source 15 and the dichroic mirror 12, but illustration thereof is omitted in FIG. 8.

White light originating from the light source 15 is separated into rays with three colors (G light, B light, R light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the zoom lens 10. The zoom lens 10 projects an optical image, which is formed by the light modulated through the transmissive display elements 11a to 11 c, onto a screen 105.

Figure 9:
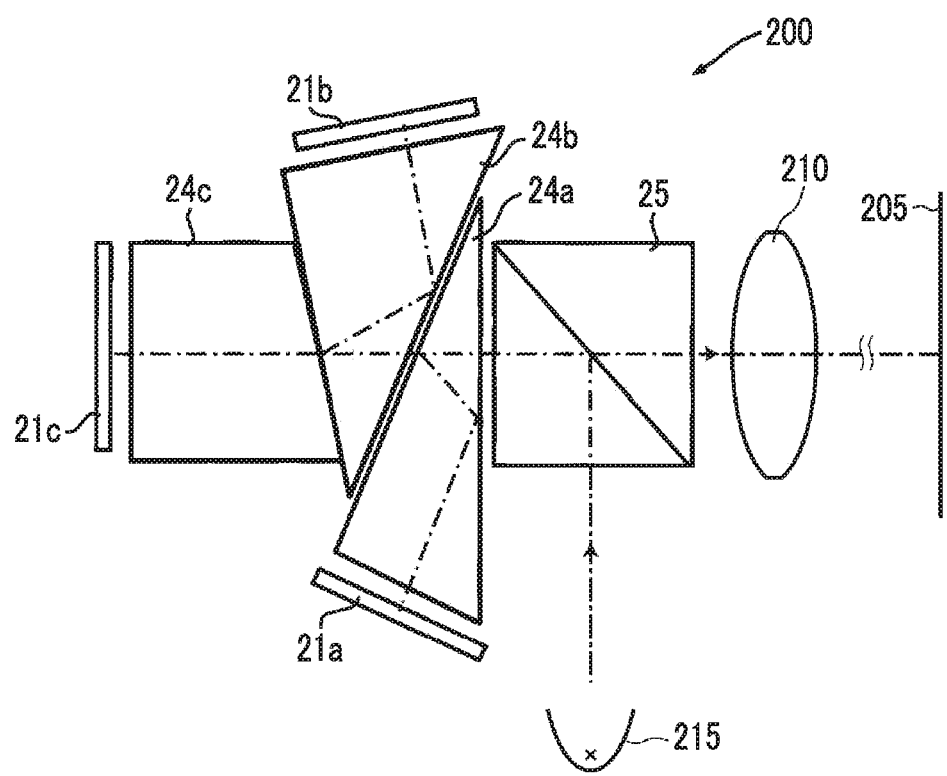
FIG. 9 is a schematic configuration diagram of a projection display device according to another embodiment of the present invention.

FIG. 9 is a schematic configuration diagram of a projection display device according to another embodiment of the present invention. The projection display device 200 shown in FIG. 9 has a zoom lens 210 according to the embodiment of the present invention, a light source 215, DMD elements 21a to 21c as light valves corresponding to respective color light beams, total internal reflection (TIR) prisms 24a to 24c for color separation and color synthesis, and a polarization separating prism 25 that separates illumination light and projection light. In FIG. 9, the zoom lens 210 is schematically illustrated. Further, an integrator is disposed between the light source 215 and the polarization separating prism 25, but illustration thereof is omitted in FIG. 9.

White light originating from the light source 215 is reflected on a reflective surface inside the polarization separating prism 25, and is separated into rays with three colors (G light, B light, R light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the zoom lens 210. The zoom lens 210 projects an optical image, which is formed by the light modulated through the DMD elements 21a to 21c, onto a screen 205.

Figure 10:
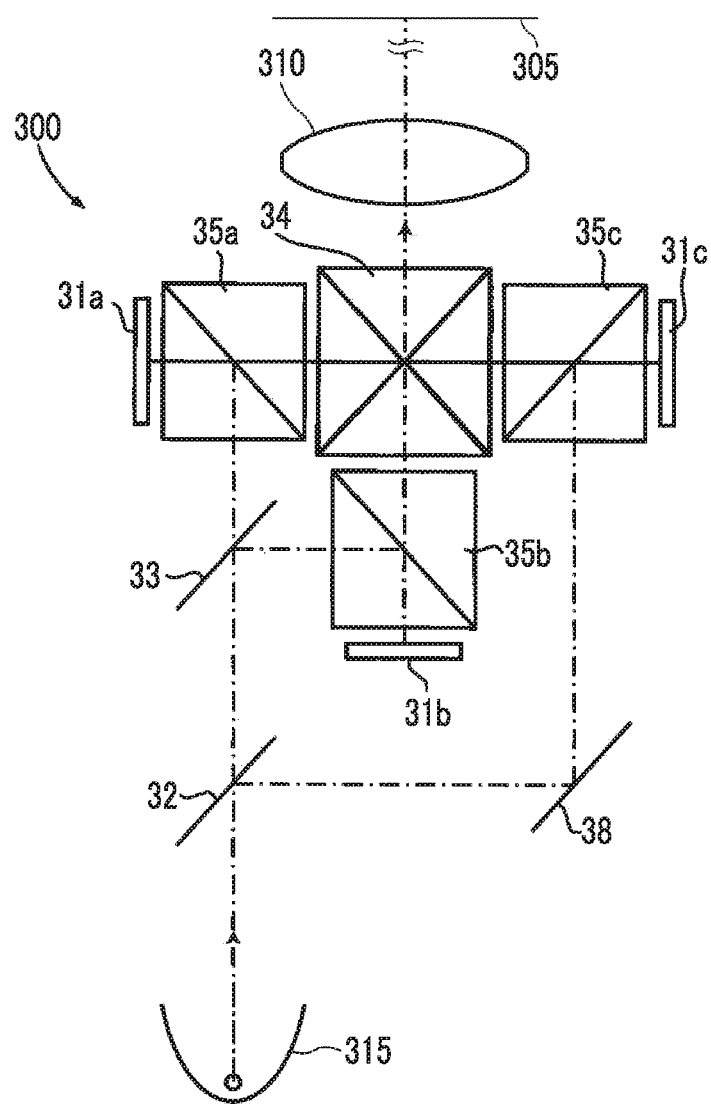
FIG. 10 is a schematic configuration diagram of a projection display device according to still another embodiment of the present invention.

FIG. 10 is a schematic configuration diagram of a projection display device according to still another embodiment of the present invention. The projection display device 300 shown in FIG. 10 has a zoom lens 310 according to the embodiment of the present invention, a light source 315, reflective display elements 31a to 31c as light valves corresponding to respective color light beams, dichroic mirrors 32 and 33 for color separation, a cross dichroic prism 34 for color synthesis, a total reflection mirror 38 for deflecting the optical path, and polarization separating prisms 35a to 35c. In FIG. 10, the zoom lens 310 is schematically illustrated. Further, an integrator is disposed between the light source 315 and the dichroic mirror 32, but illustration thereof is omitted in FIG. 10.

White light originating from the light source 315 is separated into rays with three colors (G light. B light, R light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the zoom lens 310. The zoom lens 310 projects an optical image, which is formed by the light modulated through the reflective display elements 31a to 31c, onto a screen 305.

Figure 11:
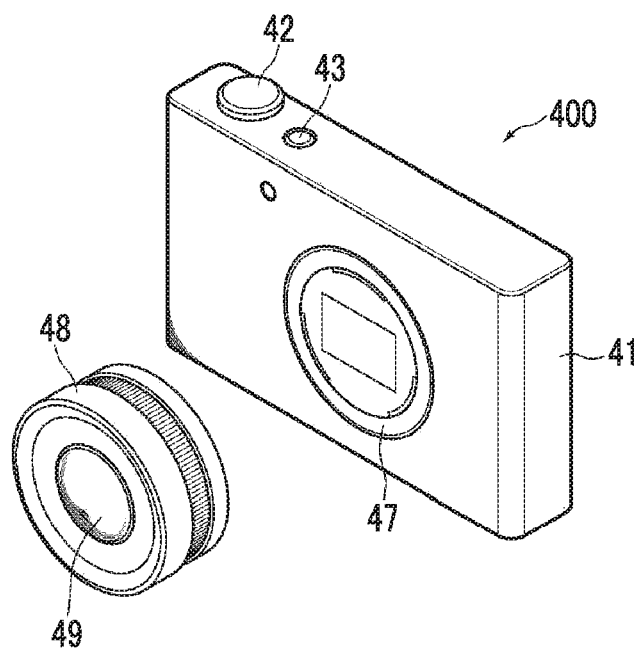
FIG. 11 is a perspective view of the front side of an imaging apparatus according to an embodiment of the present invention.
Figure 12:
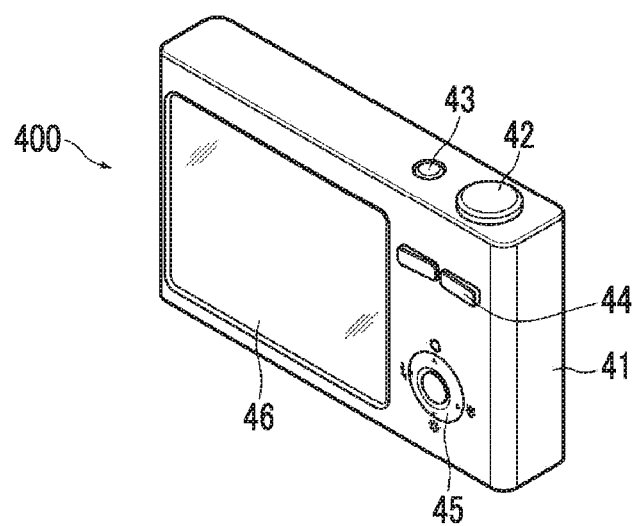
FIG. 12 is a perspective view of the rear side of the imaging apparatus shown in FIG. 11.

FIGS. 11 and 12 are external views of a camera 400 which is the imaging apparatus according to the embodiment of the present invention. FIG. 11 is a perspective view of the camera 400 viewed from the front side, and FIG. 12 is a perspective view of the camera 400 viewed from the rear side. The camera 400 is a single-lens digital camera on which an interchangeable lens 48 is detachably mounted and which has no reflex finder. The interchangeable lens 48 is configured such that a zoom lens 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown in the drawing) such as a charge coupled device (CCD) outputs a captured image signal based on a subject image which is formed through the interchangeable lens 48. The signal processing circuit generates an image through processing of the captured image signal which is output from the imaging element. The recording medium records the generated image. The camera 400 captures a still image or a moving image by pressing the shutter button 42, and records image data, which is obtained through imaging, in the recording medium.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric coefficient of each lens are not limited to the values shown in the numerical examples, and different values may be used therefor.

Further, the projection display device of the present invention is not limited to that of the above-mentioned configuration. For example, the used light valve and the optical member used in the separation or synthesis of rays are not limited to those of the above-mentioned configuration, and may be modified into various forms.

Further, the imaging apparatus of the present invention is also not limited to the above-mentioned configurations. For example, the present invention may be applied to a single-lens reflex camera, a film camera, a video camera, and the like.

What is claimed is:

1. A zoom lens that forms an intermediate image at a position conjugate to a reduction side imaging plane and causes the intermediate image to be re-imaged on a magnification side imaging plane, the zoom lens consisting of, in order from a magnification side:
   a first lens group that remains stationary with respect to the reduction side imaging plane during zooming;
   a plurality of movable lens groups that move by changing spacings between the lens groups adjacent to each other in an optical axis direction during zooming; and
   a final lens group that remains stationary with respect to the reduction side imaging plane during zooming and has a positive refractive power as a whole,
   wherein at least two of the movable lens groups are positioned to be closer to a reduction side than the intermediate image at a wide-angle end,
   wherein a lens system closer to the reduction side than the intermediate image consists of, in order from the magnification side, a front group and a rear group,
   wherein the rear group is a group, which has a maximum number of lenses included therein, among lens groups of which own magnification side focal points are positioned to be closer to the magnification side than own lens surfaces closest to the magnification side at the wide-angle end, and
   wherein the following conditional expressions (1) and (2) are satisfied, $$0.05 < |fw|/frb < 0.25 \qquad (1), \text{ and}$$

$$1 < Drv/\text{Im } \phi < 3 \qquad (2),$$

where fw is a focal length of the zoom lens at the wide-angle end,
   frb is a focal length of the rear group at the wide-angle end,
   Drv is a distance on an optical axis from a lens surface of the front group closest to the reduction side to a lens surface of the rear group closest to the reduction side at the wide-angle end, and
   Im $\phi$ is an effective image circle diameter on the reduction side.

2. The zoom lens according to claim 1, wherein each of the two movable lens groups among the plurality of movable lens groups has a positive refractive power.

3. The zoom lens according to claim 1, wherein the lens system closer to the reduction side than the intermediate image has a negative refractive power as a whole at the wide-angle end.

4. The zoom lens according to claim 1, wherein the following conditional expression (3) is satisfied, $$0.2 < |hmxr|/(\text{Im } \phi/2)| < 1 \qquad (3),$$

where hmxr is a maximum ray height on a lens surface closer to the reduction side than the intermediate image in a case where a ray with a height of |fw| from the optical axis is incident from the reduction side into the zoom lens in parallel with the optical axis at the wide-angle end.

5. The zoom lens according to claim 1, wherein the following conditional expression (4) is satisfied, $$0.8<|fw/fp|<1.2 \tag{4},$$

where fp is a focal length of the lens system closer to the magnification side than the intermediate image at the wide-angle end.

6. The zoom lens according to claim 1, wherein the intermediate image is positioned inside one of the movable lens groups at the wide-angle end.

7. The zoom lens according to claim 6, wherein the following conditional expression (5) is satisfied, $$0 \leq |(Daw-Dat)/fw| < 0.1 \tag{5},$$

where Daw is a distance on the optical axis from the intermediate image to a magnification side lens surface closest to the intermediate image on the optical axis at the wide-angle end, and Dat is a distance on the optical axis from the intermediate image to a magnification side lens surface closest to the intermediate image on the optical axis at the telephoto end.

8. The zoom lens according to claim 6, wherein the first lens group has a negative refractive power as a whole.

9. The zoom lens according to claim 1, wherein a reduction side lens closest to the intermediate image on the optical axis at the wide-angle end is a positive lens.

10. The zoom lens according to claim 9, wherein a magnification side surface of the positive lens is a concave surface.

11. The zoom lens according to claim 9, wherein the following conditional expression (6) is satisfied, $$1.7<Ndr1<2.2 \tag{6},$$

where Ndr1 is a refractive index of the positive lens at a d line.

12. The zoom lens according to claim 1, wherein the following conditional expression (1-2) is satisfied, $$0.1<|fw|/frb<0.2 \tag{1-2}.$$

13. The zoom lens according to claim 1, wherein the following conditional expression (2-1) is satisfied, $$1.4<Drv/\text{Im } \phi<2.5 \tag{2-1}.$$

14. The zoom lens according to claim 4, wherein the following conditional expression (3-2) is satisfied, $$0.3<|hmxr|/(\text{Im } \phi/2)|<0.6 \tag{3-2}.$$

15. The zoom lens according to claim 5, wherein the following conditional expression (4-2) is satisfied, $$0.9<|fw/fp|<1.15 \tag{4-2}.$$

16. The zoom lens according to claim 7, wherein the following conditional expression (5-1) is satisfied, $$0 \leq |(Daw-Dat)/fw| < 0.05 \tag{5-1}.$$

17. The zoom lens according to claim 11, wherein the following conditional expression (6-2) is satisfied, $$1.8<Ndr1<2.2 \tag{6-2}.$$

18. A projection display device comprising:
a light source;
a light valve into which light originating from the light source is incident; and
the zoom lens according to claim 1, the zoom lens projecting an optical image, which is formed by light modulated through the light valve, onto a screen.

19. An imaging apparatus comprising the zoom lens according to claim 1.

* * * * *